(12) United States Patent
Smith

(10) Patent No.: US 9,643,630 B1
(45) Date of Patent: May 9, 2017

(54) LARGE DIAMETER HOSE DRAINING DEVICE

(71) Applicant: Thomas R. Smith, Edwardsburg, MI (US)

(72) Inventor: Thomas R. Smith, Edwardsburg, MI (US)

( * ) Notice: Subject to any disclaimer, the term of this patent is extended or adjusted under 35 U.S.C. 154(b) by 0 days.

(21) Appl. No.: 15/057,591

(22) Filed: Mar. 1, 2016

(51) Int. Cl.
   *B62B 3/02* (2006.01)
   *B62B 1/12* (2006.01)

(52) U.S. Cl.
   CPC ............ *B62B 1/12* (2013.01); *B62B 3/02* (2013.01); *B62B 2202/50* (2013.01)

(58) Field of Classification Search
   CPC . B62B 3/02; B62B 2202/025; B62B 2202/50; B65H 75/403; B65H 75/4402; A62C 33/02
   See application file for complete search history.

(56) References Cited

U.S. PATENT DOCUMENTS

| | | | |
|---|---|---|---|
| 3,078,059 A * | 2/1963 | Johnson | B65H 75/403 242/391 |
| 4,280,672 A * | 7/1981 | Santos | A62C 33/02 15/40 |
| 4,288,047 A * | 9/1981 | Barry | A62C 33/04 242/395 |
| 5,388,609 A * | 2/1995 | Ghio | A62C 33/04 137/355.27 |
| H1520 H * | 3/1996 | Hannula | A62C 33/02 100/171 |
| 5,957,400 A | 9/1999 | Brannen | |
| 6,135,139 A | 10/2000 | Blake, Jr. | |
| 6,591,744 B2 | 7/2003 | Peek | |
| 7,434,820 B1 * | 10/2008 | Aliseo | B62B 3/104 211/85.5 |
| 7,661,683 B2 | 2/2010 | Fernandez | |
| 8,342,543 B2 | 1/2013 | Fernandez | |
| 8,578,847 B2 | 11/2013 | Fox et al. | |
| 8,955,786 B2 | 2/2015 | Motoji et al. | |
| 2011/0108658 A1 * | 5/2011 | Factor | B62B 1/20 242/594 |
| 2012/0193465 A1 | 8/2012 | Fernandez | |
| 2015/0041515 A1 * | 2/2015 | Hut | A62C 33/02 226/176 |

* cited by examiner

*Primary Examiner* — Frank Vanaman
(74) *Attorney, Agent, or Firm* — Botkin & Hall, LLP

(57) ABSTRACT

A hose draining device that rolls along the ground and raises up a portion of a flexible hose to facilitate draining the hose. The device has a leading roller that is close to the ground, a center roller that is spaced away from the ground, and a trailing roller that is further away from the ground than the center roller. The hose is supported by the rollers while the device moves along the length of the hose. The device has a handle portion that is removable for storage and transportation. A counterbalance may be provided near the leading roller to stabilize the device.

17 Claims, 4 Drawing Sheets

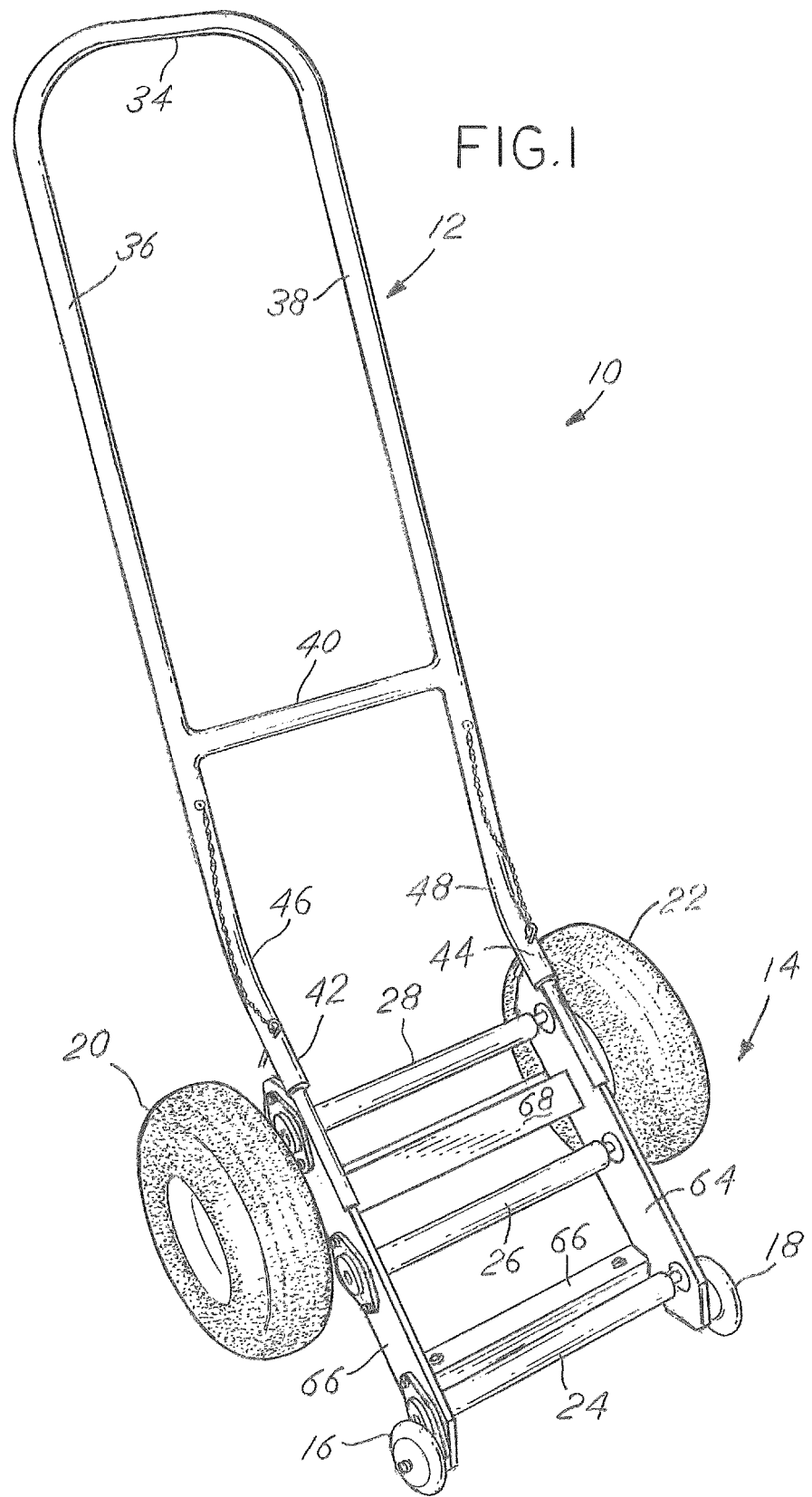

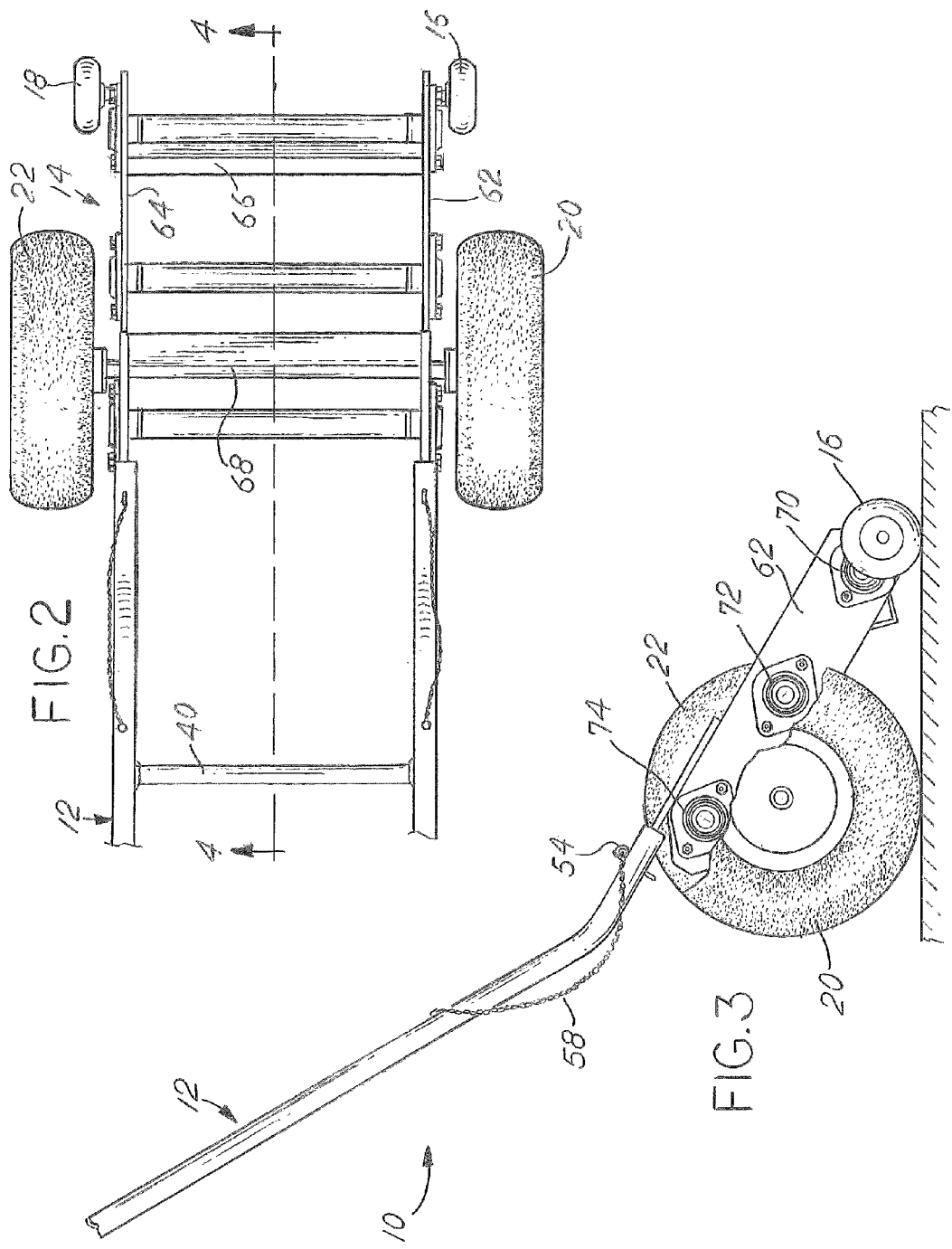

US 9,643,630 B1

LARGE DIAMETER HOSE DRAINING DEVICE

BACKGROUND OF THE INVENTION

As is known in the fire-fighting environment, an ample supply of water is critical to extinguishing many types of fires. The supply typically comes from a nearby fire hydrant, where a supply hose is attached. This allows water to flow from a municipal water source to a fire truck, nozzle, or other pumping and dispensing device. After use, the hose must be drained for proper transportation and storage. Originally, fire hose had a diameter and fluid capacity that was manageable by fire-fighting professionals. Recently, large diameter hose has been introduced, where the diameter can be over 4 inches, allowing improved supply over previous hose diameters. Because of the large diameter, the hose holds a significant amount of water, causing it to be very heavy when it is full. When the pressure is released and the ends disconnected, the hose still retains a significant amount of water, causing it to be quite heavy. Firefighters are stuck with the difficult task of draining the hose once the fire-fighting is over and it is time to return to the station. One method is to lift a part of it over one's shoulder and simply walk underneath, driving the water out one end using gravity. Shoulder and back problems are commonplace with firefighters and lifting and walking under a heavy hose to drain it only can exacerbate these problems, causing absences, missed time, disability, and increased health care costs.

Currently, there are devices available on the market that attempt to address this issue. U.S. Pat. No. 8,578,847 discloses a device for draining a hose and is commonly used for draining large diameter hose. This device lifts up a portion of the hose and then rolls over it to use gravity and then compression to drain the hose. The compression is established by the weight of the rear roller rolling over the hose. For this to work properly, the rear roller must be heavy, causing the entire device to be heavy. Another device, disclosed in U.S. Pat. No. 7,661,683 also attempts to address the issue of draining a large diameter hose. This device is made to both drain and/or coil up a hose. Because it serves two functions, it is relatively large, heavy, and complicated to use. An improved hose draining device is needed.

SUMMARY OF THE INVENTION

The present disclosure describes a compact, stowable, and lightweight device for draining a firehose. The device has front wheels and rear wheels that allow it to be rolled along the ground. The lower frame has a series of rollers that are angled with respect to the ground when the device is resting on the ground. The device is intended to be used to drain a large diameter fire hose by rolling underneath the hose and using gravity to push the water out an open end. The rollers freely rotate and support the hose as the device moves underneath. One of the rollers is leading and is closest to the ground. A middle roller is raised up from the ground and a trailing roller is furthest away from the ground. This forms a ramped surface for the hose to be gently raised up. As the device passes underneath and the hose passes the trailing roller, the hose returns to the ground, where it is now emptied of a significant amount of the water it previously held. The device has a removable handle to make it more compact for storage and transportation. The removable handle is installed by mating it to the lower frame and installing pins to lock it into position. When the handle is installed, a portion of the weight overhangs the rear wheels. A counterbalance weight is present to offset the overhanging weight of the handle to maintain stability.

BRIEF DESCRIPTION OF THE DRAWINGS

A preferred embodiment of this invention has been chosen wherein:

FIG. 1 is a top isometric view of the device;
FIG. 2 is a partial top view of the device;
FIG. 3 is a side view of the device with one of the wheels partially sectioned to show internal detail of the frame.

DESCRIPTION OF THE PREFERRED EMBODIMENT

Figure 4:
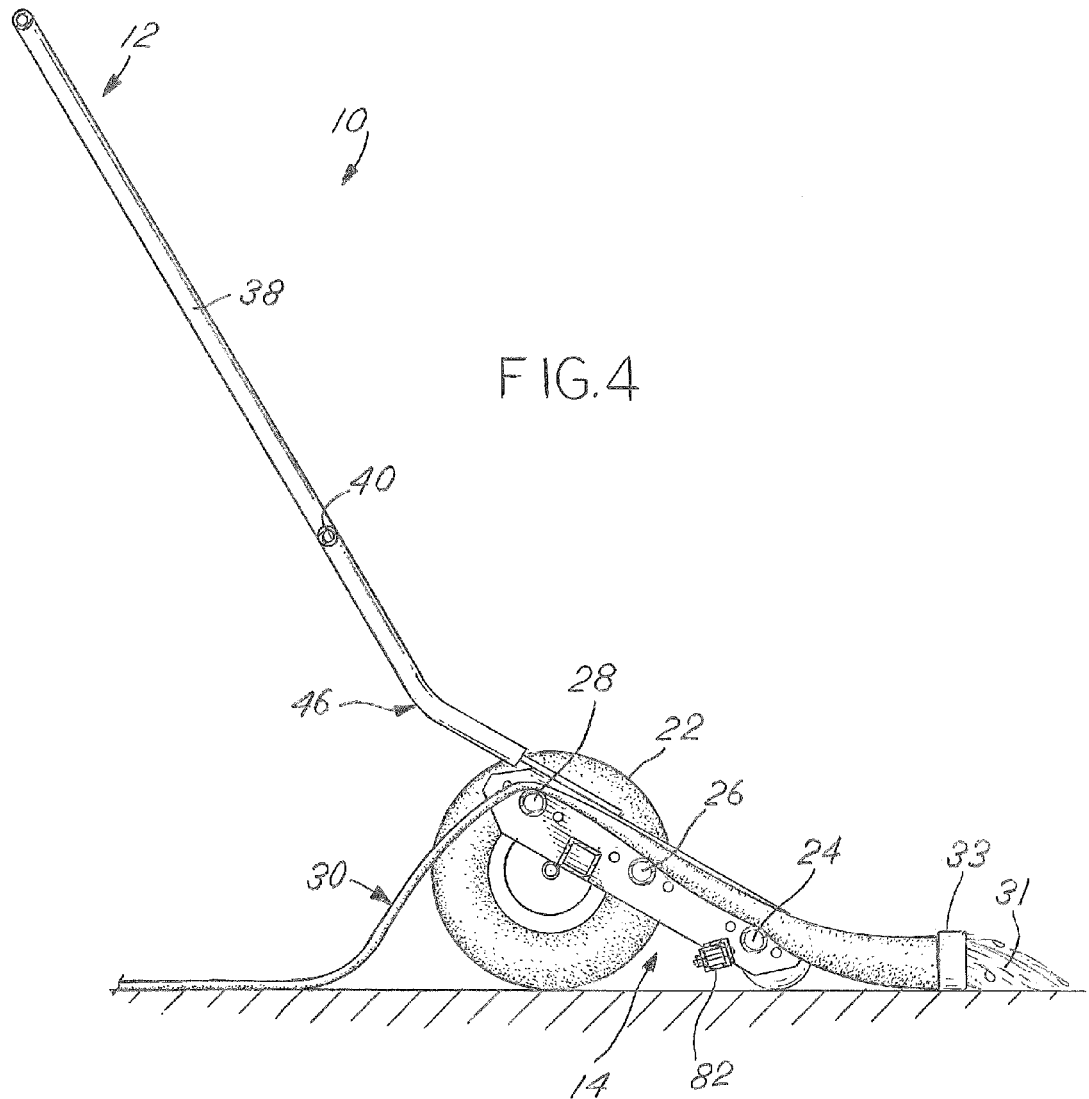
FIG. 4 is a side section view 4-4 of the device as shown in FIG. 2 being used to drain a hose.

As shown in FIG. 1, hose draining device 10 has a removable handle 12 and a lower frame 14. The device 10 is adapted to be rolled on the ground with a set of front wheels 16, 18 supporting the front of the lower frame 14 and a set of rear wheels 20, 22 to support the rear of the lower frame 14. The lower frame 14 contains a series of rollers 24, 26, and 28 that support a hose 30 in order to facilitate drainage of the hose 30 as the device 10 is rolled underneath, as shown in FIG. 4. In the embodiment described below, the device 10 is primarily made out of a lightweight material, such as aluminum, but other lightweight and robust materials are contemplated, such as other metals, fiberglass, or plastics.

Figure 5:
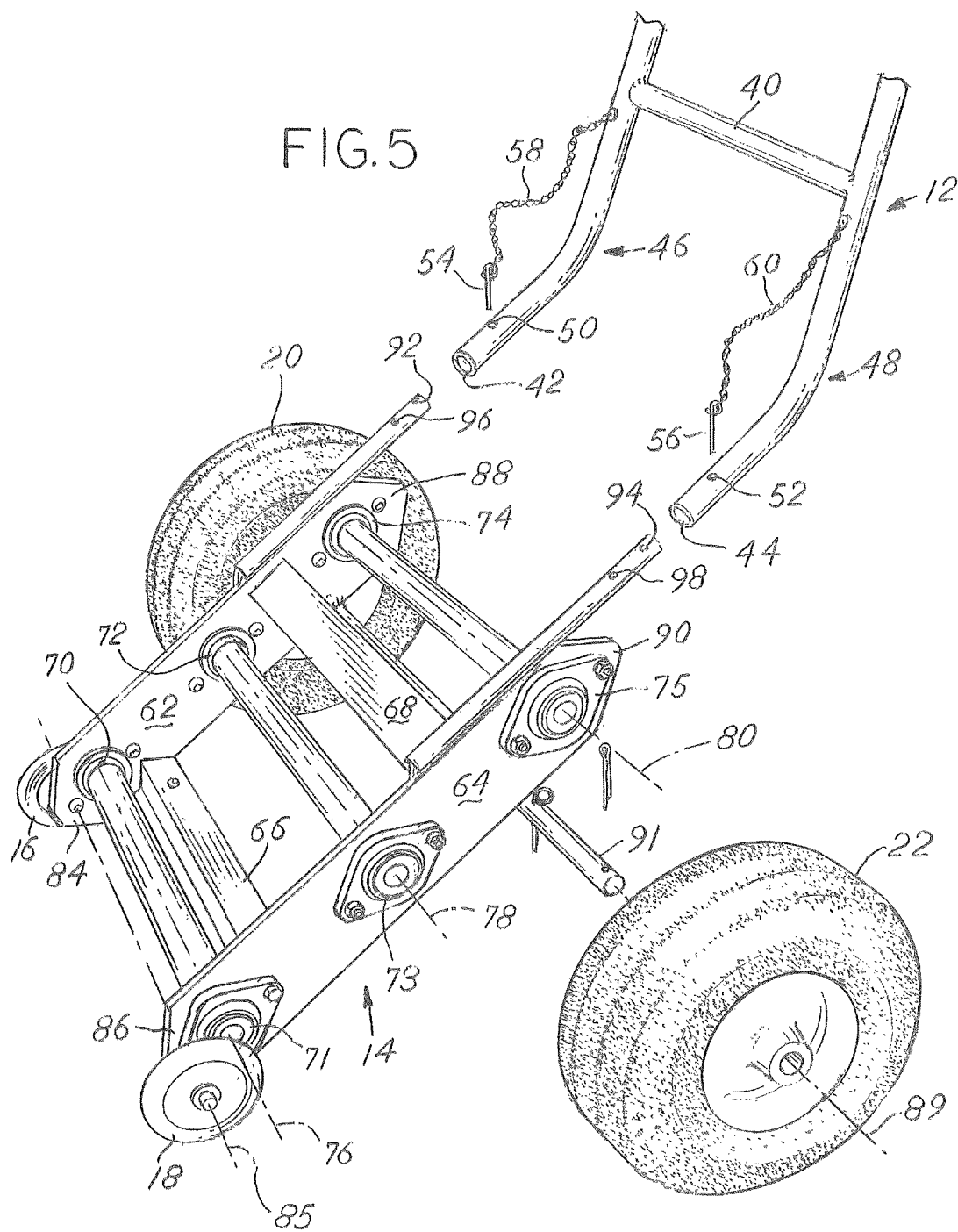
FIG. 5 is an exploded perspective view of the device.

The removable handle 12 has a single bent tubular member (shown as 34, 36, and 38) that is formed into a U-shape. The gripping portion 34 is where the user can grasp for moving the device 10. It is contemplated that the gripping portion 34 has an insulating or padding layer for user comfort. Lateral sides 36, 38 are parallel. It is contemplated that the removable handle 12 is made from several assembled components instead of a bent tubular member. A reinforcing bar 40 is located between the lateral sides 36, 38, where it supports and helps maintain the distance between the lateral sides 36, 38. As shown in FIG. 5, mating portions 42, 44 are located at terminal ends of the lateral sides 36,38. The lateral sides 36, 38 each have a corresponding bend 46, 48 located near the mating portions 42, 44. Each mating portion 42, 44 has a respective transverse hole 50, 52 that receives a corresponding pin 54, 56. Each pin 54, 56 is connected to the handle 12 by a chain 58, 60. The chain 58, 60 tethers the pins 54, 56 to the handle 12 and prevents them from becoming lost.

The lower frame 14, shown partially exploded in FIG. 5, holds the front and rear wheels 16, 18, 20, 22 that support the device 10 when it is rolled on the ground. As shown, the front wheels 16, 18 support the front portion of the lower frame 14 and the rear wheels 20, 22 support the rear portion of the lower frame 14. The lower frame 14 comprises lateral rails 62, 64 and transverse rails 66, 68. The lateral rails 62, 64 are shown parallel and spaced apart, but it is contemplated that they are angled or otherwise not parallel. Transverse rails 66, 68 are affixed to the lateral rails 62, 64 to provide rigidity and maintain the spacing of the lateral rails 62, 64. As shown, the lateral rails 62, 64 are flat and planar, but other shapes are contemplated. Lateral rail 62 holds roller bearings 70, 72, 74 and lateral rail 64 holds roller bearings 71, 73, 75. Roller bearing 70 is located opposite roller bearing 71 and rotates around a central axis 76.

Likewise, roller bearing 72 is located opposite roller bearing 73 and rotates around a central axis 78. Finally, roller bearing 74 is located opposite roller bearing 75 and rotates around a central axis 80. A leading roller 24 is supported by the bearings 70, 71 and rotates around central axis 76; a second roller 26 is supported by the bearings 72, 73 and rotates around central axis 78; and a trailing roller 28 is supported by the bearings 74, 75 and rotates around central axis 80. Each roller 24, 26, 28 has an outer diameter that contacts the hose 30 when the device 10 is being used. The embodiment shown has three rollers 24, 26, 28 but it is contemplated that the device 10 has two or less or more than three. It is further contemplated that a belt (not shown) circumscribes all of the rollers to form a continuous surface. As shown, the central axes 76, 78, 80 align in a plane. Due to this alignment, the three rollers 24, 26, 28 constructively form a ramped support for the hose 30 to ride over as the user moves the device 10 under it. It is contemplated that the alignment of the rollers 24, 26, 28 effectively forms a crowned or dished surface for the hose 30.

The front wheels 16, 18 are affixed to the front portion near leading ends 84, 86 of the lateral rails 62, 64 and rotate about axis 85. As shown, the rear wheels 20, 22 rotate on and are affixed to a rear axle 91 which is affixed to the rear portion near trailing ends 88, 90 of the lateral rails 62, 64. The axle 91 has a rear axis 89. The placement and size of the rear wheels 20, 22 as they relate to the placement and size of the front wheels cause the leading roller 24 to be much closer to the ground than the trailing roller 28. The transverse rail 66 includes a counterbalance 82 that is located near the front wheels 16, 18. The counterbalance 82 offsets the overhanging weight from the handle 12 when the device 10 is fully assembled. It is contemplated that the lower frame 14 has a weight distribution where a counterbalance 82 is unnecessary.

Extending beyond the trailing ends 88, 90 are handle mating portions 92, 94. Each of the handle mating portions 92, 94 are designed to mate with the mating portions 42, 44. Further, the handle mating portions 92, 94 have receiving holes 96, 98 that align with transverse holes 50, 52 when the handle 12 and lower frame 14 are mated. The receiving holes 96, 98 align with transverse holes 50, 52 to receive a corresponding pin 54, 56 to lock the handle 12 to the lower frame 14. Although the described embodiment uses a hollow shaft that receives a smaller shaft to form the mating portions 42, 44, other alternate methods to affix the handle 12 to the lower frame 14 are contemplated. It is also contemplated that the handle 12 is affixed to the lower frame 14 with locking hinges where bends 46, 48 are located. This allows the device to convert from a stored position to a use position without having to perform any assembly. The hinge would incorporate a locking feature. If the handle 12 was affixed by a hinge (not shown), the handle 12 would be capable of folding down, where it would overlay the rollers 24, 26, 28. It is further contemplated that the mating portions 42, 44 incorporate alternate affixing methods, including but not limited to spring-loaded buttons, magnets, clamps, bolts, or cotter pins.

To use the device 10, the user first connects the handle 12 to the lower frame 14 at the appropriate handle mating portions 92, 94 and places the pins 54, 56 to affix the handle 12 to the lower frame 14. The user then rolls the device 10 up to a hose 30 and lifts the hose coupling up and over the rollers 24, 26, 28, where the coupling is closest to the trailing roller 28. The user then pushes the device 10 along the length of the hose 30 as shown in FIG. 5 where the flexible portion of the hose 30 is first lifted away from the ground by the leading roller 24, then the second roller 26, and finally the trailing roller 28. After the trailing roller 28 has passed under the hose 30, the weight of the empty hose pulls it back to the ground. While the user is moving the device 10 under the hose 30, water 31 is expelled from the coupling 33 on the far end. When all of the hoses 30 are drained, the user can then remove the pins 54, 56 and separate the handle 12 from the lower frame 14. At this point, the user can store the device 10 where it is ready for the next use.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A lightweight and stowable hose draining device adapted to be moved along a substantially horizontal surface being separate from said device, to drain flexible hoses, said device comprising:
   a lower frame having a first frame rail portion and a second frame rail portion being spaced therefrom and substantially parallel thereto, each said frame rail portion having a leading edge located at a first terminal end and an oppositely located trailing edge located at a second terminal end, said lower frame having a counterbalance extending transversely between said first and second rail portions and located near said leading edge, said lower frame having a handle mating portion extending beyond said trailing edge of said frame rail portions;
   front wheels being rotatable about a front axis and having an outer diameter adapted to contact said substantially horizontal surface, said front axis being located adjacent said counterbalance;
   rear wheels being rotatable about a rear axis and having an outer diameter adapted to contact said substantially horizontal surface, said rear axis being located nearer said trailing edge than said front axis;
   a plurality of rollers being located between said first and second frame rail portions, each of said rollers rotatable about a corresponding central axis, one of said rollers being a leading roller located at a close distance to said leading edge, another of said rollers being a trailing roller located at a close distance to said trailing edge;
   each said central axis aligned to form a plane being obliquely angled with respect to said substantially horizontal surface when said outer diameters of said front and rear wheels are contacting said substantially horizontal surface, said leading roller adapted to be located at a close distance to said substantially horizontal surface and said trailing roller adapted to be located at a far distance from said substantially horizontal surface; and
   a removable handle being fixable to said handle mating portion on said lower frame, a portion of said removable handle being obliquely angled with respect to said frame rails when said removable handle is affixed to said lower frame.

2. The draining device of claim 1, said outer diameter of said front wheels being smaller than said outer diameter of said rear wheels.

3. The draining device of claim 1, another of said rollers being a center roller located between said leading and trailing rollers.

4. The draining device of claim 3, said center roller located at a midpoint between said leading and trailing rollers.

5. A hose draining device adapted to be rolled along a substantially horizontal surface being separate from said device, said device adapted to support a portion of a flexible hose to drain said flexible hose, said device comprising:
- a removable handle;
- a lower frame having a first frame rail and a second frame rail being spaced therefrom and substantially parallel thereto, each said frame rail having a leading edge located at a first terminal end and an oppositely located trailing edge located at a second terminal end, said lower frame having a front portion having front wheels being rotatable about a front axis and a rear portion having rear wheels being rotatable about a rear axis, said front wheels having a first outer diameter being smaller than a second outer diameter of said rear wheels, said front wheels being located near said leading edge and said rear wheels being located near said trailing edge, said front axis being closer to said substantially horizontal surface than said rear axis when said outer diameters of said wheels contact said horizontal surface;
- a leading roller being rotatable about a central axis spanning between said first and second frame rails near said leading edge, a trailing roller being rotatable about a central axis and spanning between said first and second frame rails near said trailing edge, a center roller being rotatable about a central axis and spanning between said first and second frame rails, said central roller located between said leading and said trailing rollers;
- each of said leading, trailing, and center rollers having an outer radius surface, said outer radius surfaces being aligned to form a plane between said first and second frame rails, said plane formed from said leading, central, and trailing rollers being near said substantially horizontal surface proximate said leading roller and said plane being far from said substantially horizontal surface proximate said trailing roller; and
- said lower frame having a handle mating portion adapted to fix said removable handle to said lower frame.

6. The device of claim 5, said front portion of said lower frame having a counterbalance weight.

7. The device of claim 5, said device having pins to affix said removable handle to said frame at said handle mating portion.

8. The device of claim 7, said pins being tethered to said removable handle.

9. The device of claim 5, said central axes of said front, center, and trailing rollers being aligned in a plane.

10. The device of claim 5, said front axis, said rear axis, and said central axes of said front, center, and trailing rollers being parallel.

11. A hose draining device adapted to be rolled along a substantially horizontal surface being separate from said device, said device adapted to support a portion of a flexible hose to drain said flexible hose, said device comprising:
- a removable handle;
- a lower frame having a first frame rail and a second frame rail being spaced therefrom, each said frame rail having a leading edge located at a first terminal end and an oppositely located trailing edge located at a second terminal end, said lower frame having a front portion having front wheels being rotatable about a front axis and a rear portion having rear wheels being rotatable about a rear axis, said front wheels having a first outer diameter and said rear wheels having a second outer diameter, said front wheels being located near said leading edge and said rear wheels being located near said trailing edge, said front axis being closer to said substantially horizontal surface than said rear axis when said outer diameters of said wheels contact said horizontal surface;
- a leading roller being rotatable about a central axis spanning between said first and second frame rails near said leading edge, a trailing roller being rotatable about a central axis and spanning between said first and second frame rails near said trailing edge, a center roller being rotatable about a central axis and spanning between said first and second frame rails, said central roller located between said leading and said trailing rollers;
- each of said leading, trailing, and center rollers having an outer radius surface, said outer radius surfaces being aligned to form a plane between said first and second frame rails, said plane formed from said leading, central, and trailing rollers being near said substantially horizontal surface proximate said leading roller and said plane being far from said substantially horizontal surface proximate said trailing roller; and
- said lower frame having a handle mating portion adapted to fix said removable handle to said lower frame.

12. The device of claim 11, said frame rails being parallel.

13. The device of claim 11, said front portion of said lower frame having a counterbalance weight.

14. The device of claim 11, said device having pins to affix said removable handle to said frame at said handle mating portion.

15. The device of claim 14, said pins being tethered to said removable handle.

16. The device of claim 11, said central axes of said front, center, and trailing rollers being aligned in a plane.

17. The device of claim 16, said front axis, said rear axis, and said central axes of said front, center, and trailing rollers being parallel.

* * * * *